United States Patent [19]

Glinsmann

[11] 4,300,635

[45] Nov. 17, 1981

[54] AQUEOUS PETROLEUM SULFONATE MIXTURE AND METHOD OF USE IN POST-PRIMARY OIL RECOVERY

[75] Inventor: Gilbert R. Glinsmann, Bartlesville, Okla.

[73] Assignee: Phillips Petroleum Company, Bartlesville, Okla.

[21] Appl. No.: 122,349

[22] Filed: Feb. 19, 1980

Related U.S. Application Data

[63] Continuation-in-part of Ser. No. 668,347, Mar. 19, 1976, abandoned.

[51] Int. Cl.$^3$ ............................................... E21B 43/22
[52] U.S. Cl. ................................. 166/274; 252/8.55 D
[58] Field of Search ................... 252/8.55 D; 166/274

[56] References Cited

U.S. PATENT DOCUMENTS

| | | | |
|---|---|---|---|
| 2,342,106 | 2/1944 | Jones et al. | 252/8.55 |
| 3,302,713 | 2/1967 | Ahearn et al. | 166/274 |
| 3,373,808 | 3/1968 | Patton | 166/274 |
| 3,493,047 | 2/1970 | Davis et al. | 166/252 |
| 3,653,437 | 4/1972 | Gale et al. | 166/274 X |
| 3,682,247 | 8/1972 | Jones | 166/274 X |
| 3,739,848 | 6/1973 | Lawson et al. | 166/274 |
| 3,761,401 | 9/1973 | Coleman et al. | 208/311 |
| 3,768,560 | 10/1973 | Hill et al. | 166/274 |
| 3,827,496 | 8/1974 | Schroeder | 166/274 X |
| 3,943,059 | 3/1976 | Chiu | 252/8.55 |

OTHER PUBLICATIONS

Wilchester et al., "Laboratory Studies on Oil Recovery with Aqueous Solutions of Oil Soluble Sulfonates", Spe Paper No. 4742, 1974, 8 pages.

*Primary Examiner*—Herbert B. Guynn

[57] ABSTRACT

An aqueous mixture is made of water, oil containing petroleum sulfonate, inorganic salt and, optionally, polymeric material wherein the polymeric material is added when it is desired to increase the viscosity of the mixture so that it is more suitable for use in certain types of oil recovery processes. The oil-to-active petroleum sulfonate ratio is adjusted to a preferred amount and oil in the petroleum sulfonate can be extracted and another oil can be added to replace the extracted oil so that the mixture has an increased tolerance to inorganic salt.

34 Claims, 3 Drawing Figures

AQUEOUS PETROLEUM SULFONATE MIXTURE AND METHOD OF USE IN POST-PRIMARY OIL RECOVERY

This is a continuation-in-part application of application Ser. No. 668,347, filed Mar. 19, 1976, now abandoned.

The present invention relates to a method of preparing a phase-stable aqueous surfactant dispersion or mixture which is effective for displacing crude oil in a porous medium or subterranean formation. Many methods are known today for secondary oil recovery in which flooding is used to displace the oil in the oil-bearing formation. Much development work has been done using both surfactant floods and aqueous polymer mixture floods which improve the efficiency of secondary oil recovery. The present invention is particularly directed toward an aqueous mixture which is used as a flooding medium with the aqueous mixture containing petroleum sulfonate, inorganic salt and, optionally, a water-soluble polymer. The combination of petroleum sulfonate and salt reduces the interfacial tension between the mixture and the oil in the formation and the polymer, when employed in the mixture, is used as a viscosifying agent to increase the viscosity of the flooding medium to further enhance recovery efficiency. However, such processes in the past have encountered problems in that certain mixtures containing both petroleum sulfonate and polymer have not had sufficiently low interfacial tension with the oil contained in the formation and the mixtures have exhibited, in certain instances, phase instability. This phase instability, which is known to adversely affect oil recovery, results from the interaction between the surfactant and polymer. Similarly, when mixtures containing petroleum sulfonate without the polymer are displaced through a formation by a mobility buffer slug containing water and polymer, phase instability at the interface between the mixture and the mobility buffer can also be caused by interaction between the polymer and the surfactant also adversely affecting oil recovery. This invention provides for a method of reducing this interaction thereby permitting the preparation of phase stable mixtures which are effective in displacement of crude oil from subterranean formations. This is achieved by adjusting the oil-to-active petroleum sulfonate ratio within a preferred range using a preferred type of oil.

The principal objects and advantages of the present invention are: to provide a method of making an aqueous mixture containing petroleum sulfonate, inorganic salt and, optionally, polymer wherein the mixture has an increased salt tolerance in an amount which is sufficient to reduce the interfacial tension between the oil in the formation and the mixture so as to increase the efficiency of the flooding medium; to provide such a mixture which will be phase-stable in use and still have adequate mobility control; to provide such a mixture which can use commercially available materials to form the mixture; and, to provide such a mixture which is usable in secondary or post-primary oil recovery processes and is well adapted for its intended purpose.

Other objects and advantages of the present invention will become apparent from the following description taken in connection with the accompanying drawings wherein are set forth by way of illustration and example certain embodiments of this invention.

Figure 1:
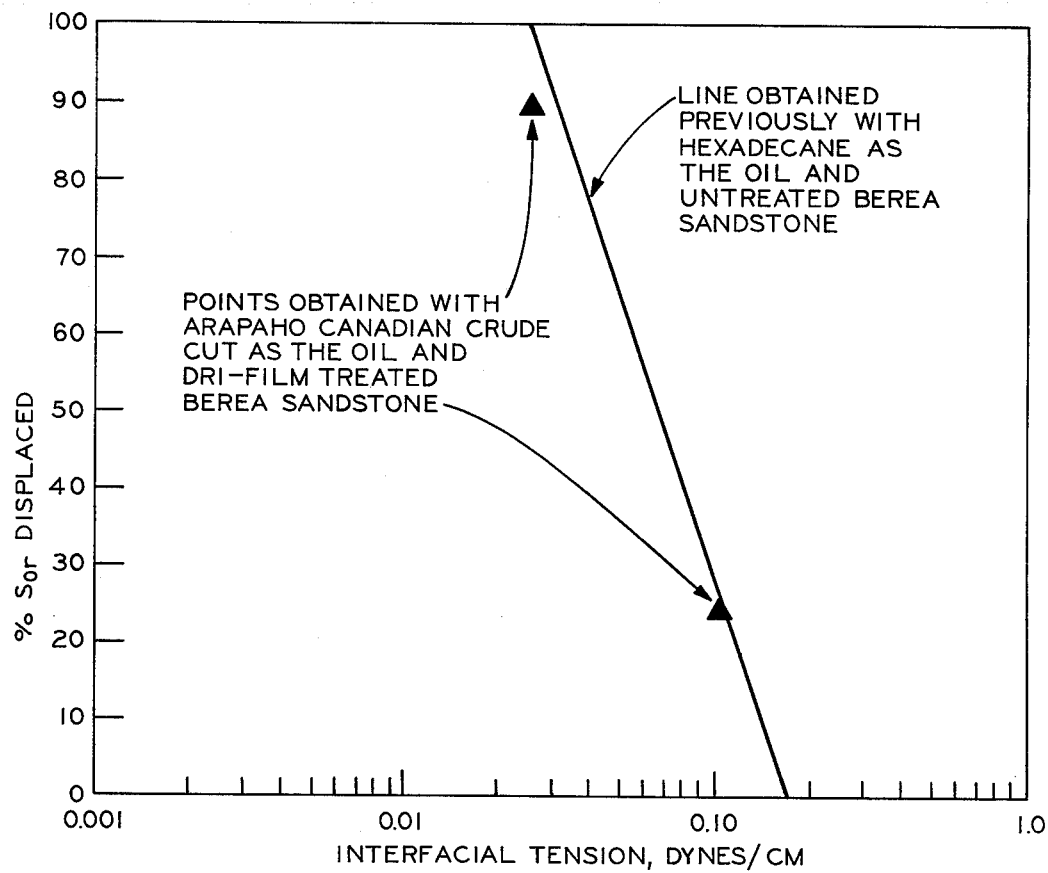
FIG. 1 is a graph which illustrates the relationship between interfacial tension and the percent of oil displaced.

Referring more in detail to the drawings:

As required, detailed embodiments of the invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any apropriate manner.

Suitable materials are selected to form a mixture containing water, oil containing petroleum sulfonate, a water-soluble polymer and inorganic salt and can also include a cosurfactant, or to form a mixture containing water, oil containing petroleum sulfonate, and an inorganic salt and an optional cosurfactant. The term "petroleum sulfonate" refers to a complex mixture of components including aryl sulfonates and alkaryl sulfonates with the mixture consisting mostly of monosulfonates having one $SO_3Na$ (or $—K$ or $—NH_4$) group per molecule. These individual hydrocarbonyl sulfonates, for example, can include the following compounds: alkylbenzene sulfonates such as ammonium, sodium, and potassium dodecylbenzene sulfonate ($C_{18}H_{29}SO_3NH_4$ or Na or K); alkylsulfonates such as sodium and potassium, octadecane sulfonate ($C_{18}H_{29}SO_3Na$ or K); phenylalkyl sulfonates such as sodium, potassium and ammonium phenyl dodecane sulfonate ($C_{18}H_{29}SO_3NH_4$ or Na or K). As used herein, the term "equivalent weight" is used in the usual manner and in the case of pure monosulfonates, the equivalent weight equals the molecular weight whereas the equivalent weight of disulfonates would be half their molecular weight. In the case of mixtures of sulfonates such as the petroleum sulfonates, the equivalent weight refers to the average of the diverse equivalent weights. Two petroleum sulfonates usable in the present invention are Stepan Agent 587-50-2 and Witco TRS 10-410.

Stepan Agent 587-50-2 is described as being made up of 40.3 weight percent sulfonate, 46.1 weight percent unreacted oil, 9.16 weight percent water, and 4.0 weight percent salt. It has an average equivalent weight of sulfonate equal to 434 and is a product of Stepan Chemical Co., Northfield, Illinois 60093. Witco TRS 10-410 is described as being made up of 62 weight percent sulfonate, 32.3 weight percent mineral oil, 5.3 weight percent water, and 0.4 weight percent inorganic salt. It has an average equivalent weight of 418 and is available from Witco Chemical Corp., 277 Park Avenue, New York, New York 10017.

The polymers usable in the present invention are water-soluble and are added to the mixture or to a mobility control slug containing water, polymer and, optionally, a suitable electrolyte which would follow the mixture into an oil-bearing formation for mobility control by virtue of the fact that such polymers increase the viscosity of the mixture or of the mobility control slug above the respective viscosities which the mixture or the mobility control slug would have without the polymer. Such polymers include polyacrylamide, polysaccharide and carboxymethylcellulose which are all materials well known in the art. Preferably the polyacrylamides are substantially linear homopolymers and copolymers of acrylamide and methacrylamide and can have up to about 75 percent and preferably up to about 45 percent of carboxamide groups hydrolyzed to carboxyl groups. Polyacrylamides are well known in the art and can be obtained commercially, typical examples of which are: Dow Pusher 700 and Dow Pusher 1000 marketed by Dow Chemical Company, Midland, Michigan, and Betz Hi-Vis sold by Betz Laboratories, Inc., Trevose, Pennsylvania. Polysaccharides are also well known in the art and include the ionic heteropolysaccharides produced by fermentation of carbohydrates by bacteria of the genus Xanthomonas. The polysaccharides are commercially available and typical examples of polysaccharides include: Kelzan and Kelzan MF sold by Kelco Company, Los Angeles, California. Carboxymethylcellulose is alwo well known in the art and is commercially available, typical examples of which are: CMC-7, CMC-9 and CMC-12 wherein 7, 9 and 12 refer to a degree of substitution of 0.7, 0.9 and 1.2, respectively. The different grades of CMC are marketed by Drilling Specialties Co., Bartlesville, Oklahoma 74004.

The salts which are used to form the mixture are inorganic and are added to reduce the interfacial tension between the mixture and the oil contained in the formation with such salts typically including sodium sulfate, sodium nitrate, sodium chloride, sodium tripolyphosphate ($Na_5P_3O_{10}$), sodium carbonate, etc. Preferably, the salts are monovalent metallic salts.

It is also to be noted that a cosurfactant may also be added to the mixture and such cosurfactants including alcohols such as isopropanol, n- and isobutanols.

In the past, it has been found that addition of a water-soluble polymer as a viscosifying agent to aqueous dispersions containing desired concentrations of petroleum sulfonate and inorganic salt resulted in phase instability of the dispersion. Similarly, when mixtures containing desired concentrations of petroleum sulfonate and inorganic salt without water soluble polymer are displaced through a formation by a mobility buffer slug containing water and water soluble polymer, phase instability at the interface between the mixture and the mobility buffer slug can also be caused by interaction between the polymer and the surfactant mixture of water, petroleum sulfonate and inorganic salt, due at least in part to fingering of the mobility buffer slug into the surfactant mixture slug. By phase unstable is meant that the dispersion separates into two or more visible phases, usually by flocculation, precipitation or multi-fluid phase formation. Such behavior is known to adversely affect oil displacements. By appropriately adjusting the oil-to-active petroleum sulfonate ratio of the surfactant preferably using a preferred type of oil, phase stable mixtures can be prepared which simultaneously meet the low interfacial tension and mobility requirements for an effective oil displacement process.

Frequently, commercial petroleum sulfonates will contain minor amounts of oil, usually to facilitate in handling of the bulk product. Hereafter, this oil will be referred to as "diluent oil". If the characteristics of the diluent oil contained in the petroleum sulfonate are sufficiently satisfactory, adjustment of the oil-to-sulfonate ratio can be made directly. If not, it is preferred to remove the undesirable diluent oil prior to making the oil-to-active petroleum sulfonate ratio adjustment. It is desired to remove a diluent oil if it prevents the mixture from being stable and from having a salt tolerance such that the combination of salt and surfactant will produce an interfacial tension between the residual oil (that is the oil to be displaced from the porous media) and mixture of less than 0.01 dynes/cm.

In the practice of this invention as described above, the undesirable diluent oil is removed or separated from the petroleum sulfonate in a manner which is known in the art as, for example, by alcohol-water extraction. An example of this art will be discussed in the examples below. Preferably, after the step of removing most of undesirable diluent oil, the petroleum sulfonate residue will contain approximately 15 percent or less diluent oil. The preferred oil is then added which when mixed with the mixture will increase the tolerance of the mixture to higher salt concentration than would have been obtainable without the addition. It is preferred that the oil be of a type which permits the mixture to tolerate a total inorganic salt concentration of up to 10 percent of the total weight of the mixture and preferably from 0.5 percent to 4.0 percent of the total mixture weight. Preferably, the additive oil has an average molecular weight in the range of approximately 250 to 400, as determined by ASTM D-2502, and a distillation temperature range, as determined by ASTM D-1160, of between 600° F. and 1100° F. and preferably between 700° F. and 900° F. In addition, the oil should be sufficiently low in waxy components to prevent plugging of the porous medium. The active ingredient of the petroleum sulfonate should be in the range of 1 to about 10 percent of the total weight of the mixture and preferably from about 2 percent to 5 percent of the total mixture weight. The weight ratio of oil, i.e., additive oil, if any, plus diluent oil, to active petroleum sulfonte is at least about 0.5 and preferably is between 0.5 and 2.0 and more preferably between 1.0 to 1.5. The added polymer, if any, should be in the range of approximately 0.005 to 1.0 percent to the total mixture weight and preferably from 0.025 to 0.30 percent of the total mixture weight. If cosurfactant is added to the mixture it should be in the range of approximately 0 percent to 10 percent of the total mixture weight and preferably from 2 percent to 5 percent of the total mixture weight. The remainder of the mixture is made up with water. The various component parts of the mixture are blended or mixed in any suitable manner and can be used by injecting same into a porous media such as subterranean oil-bearing formation in a slug ahead of a driving fluid slug. If the mixture contains polymer, a mobility buffer slug may be optionally interposed between the mixture and the driving fluid slug. If the mixture contains no polymer a mobility buffer is preferably interposed between the mixture and the driving fluid slug. A suitable mobility buffer contains water, water soluble polymer and, optionally, a suitable electrolyte. Suitable electrolytes for this purpose include sodium sulfate, sodium nitrate, sodium chloride, sodum tripolyphosphate ($Na_5P_3O_{10}$), sodium carbonate and the like. Preferably, the electrolyte is a monovalent metallic salt.

Inorganic salt tolerance of the surfactant dispersion is required primarily for two reasons. This first results from the fact that surfactant flood compositions must be prepared with field brines for economic reasons. Frequently these brines will contain significant amounts of total dissolved solids, and, hence, some inorganic salt tolerance is inherently required. In addition, aqueous dispersions of sulfonates such as petroleum sulfonates in the absence of a significant amount of inorganic salt do not yield sufficiently low interfacial tension wih crude oil to be effective in oil displacement. The addition of inorganic salts in surfactant flooding processes enhances the ability of petroleum sulfonates which have an average equivalent weight of approximately 350 to 500 to reduce the interfacial tension between oil and water. FIG. 1 graphically depicts the relationship between interfacial tension and the percent of oil recovered. From the graph it is seen that the interfacial tension should be below about 0.026 dynes/cm. to effect 100 percent oil recovery. FIG. 1 shows interfacial tension in dynes/cm. vs. percent residual oil saturation displaced. This graph was obtained by plotting data obtained from the use of hexadecane as the oil to be displaced in an untreated Berea sandstone core. Further, two points on this graph were obtained by the use of Arapahoe Canadian crude cut as the oil in Berea sandstone cores which were treated with Dri-Film-144, a silicone water repellent from General Electric, Schenectady, N.Y. to render the rock oil-wet. The top horizontal line on the graph shows 100 percent residual oil displacement which intersects with the line drawn from experimental values at an interfacial tension value of about 0.026 dynes/cm.

Figure 2:
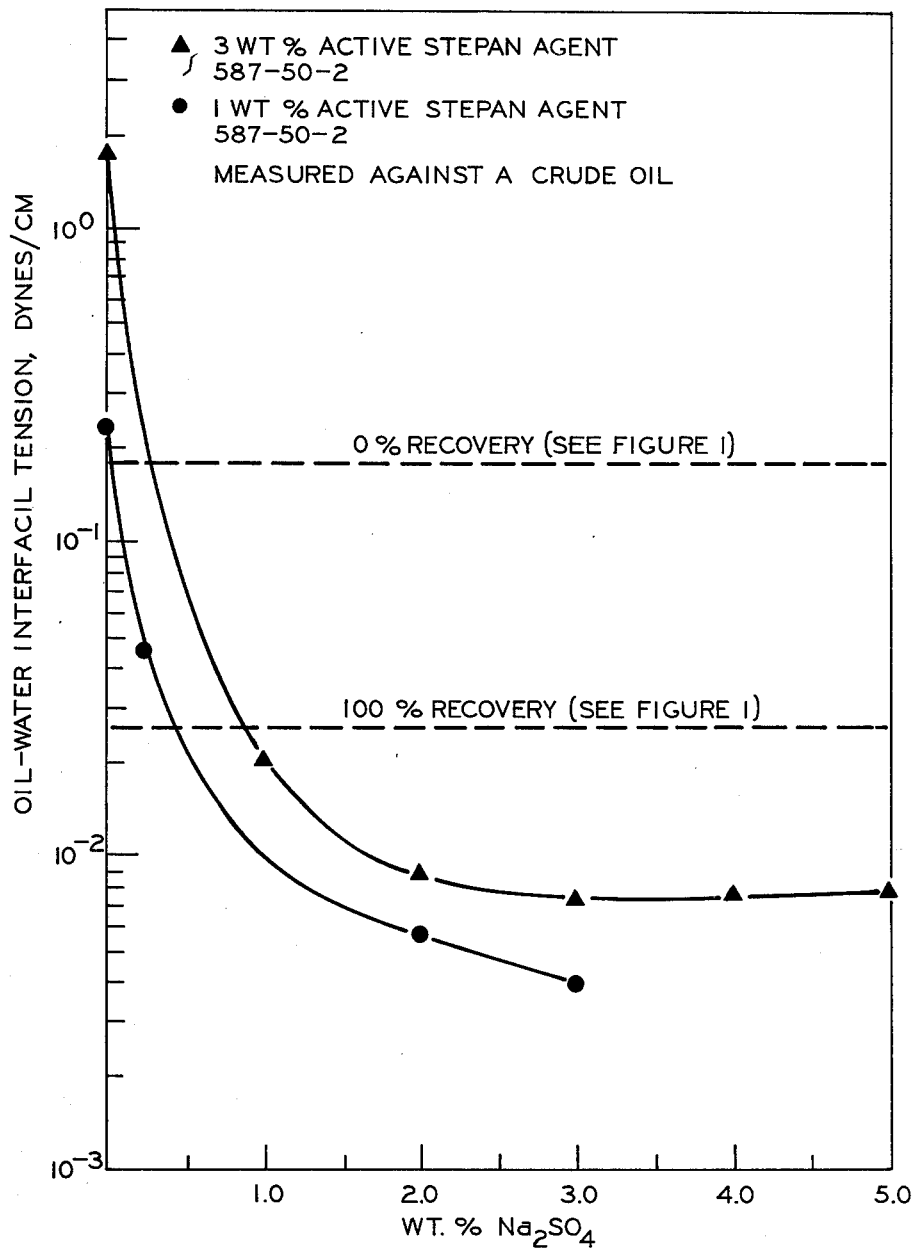
FIG. 2 is a graph depicting the relationship between interfacial tension and the percent of inorganic salt with lines denoting zero percent oil recovery and 100 percent oil recovery.

FIG. 2 graphically depicts the relationship between interfacial tension and the weight percent of inorganic salt in the mixture with two horizontal lines on the graph showing 0 percent oil recovery and 100 percent oil recovery. It can be seen from the graph that the 100 percent oil recovery line corresponds to an interfacial tension of about 0.026 dynes/cm. and further, the graph shows that interfacial tension in the range of 0.001 to 0.026 dynes/cm. is preferred for effective oil displacement in varying amounts of oil recovered.

The interfacial tension value of 0.026 dynes/cm. was obtained using Berea sandstone cores and in actual field use an interfacial tension of below about 0.01 dynes/cm. would be desirable and would produce approximately 100 percent oil recovery. It is to be understood that the interfacial tension requirements for an effective surfactant flood process will vary somewhat with factors such as rock permeability, pore geometry, wettability and bulk reservoir pressure gradient. However, it is believed that interfacial tensions in the range of 0.01 to 0.001 dynes/cm. are sufficient for effective displacement under most conditions.

Figure 3:
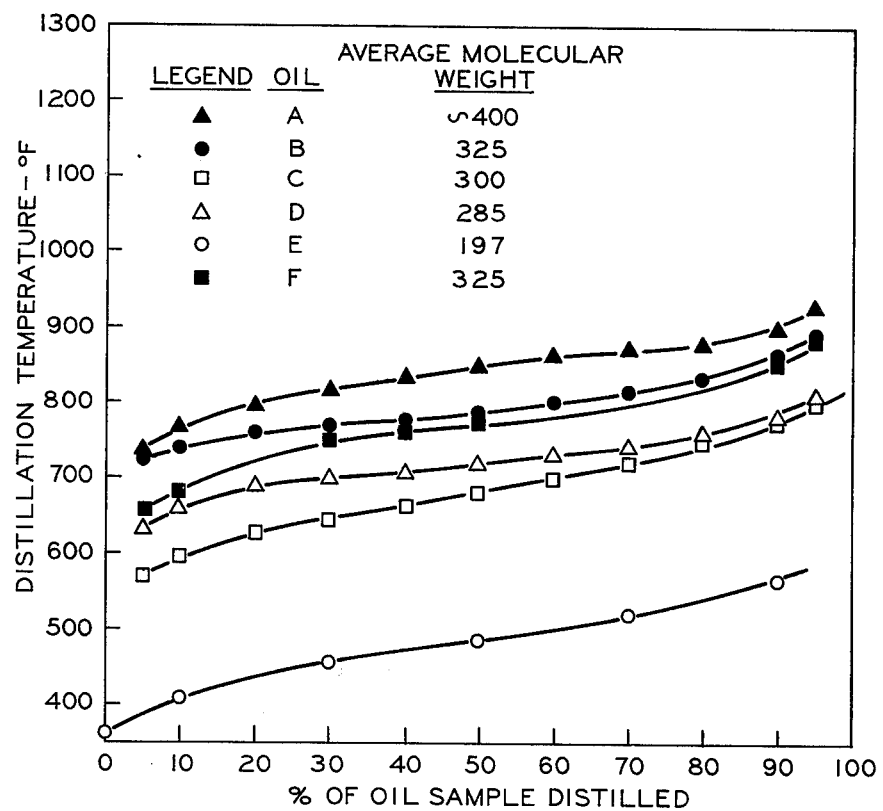
FIG. 3 is a graph showing distillation temperature ranges for various oils.

FIG. 3 graphically illustrates the relationship between distillation temperature ranges versus percent of oil distilled overhead for various oils as determined by ASTM D-1160.

Dilute aqueous petroleum sulfonate mixtures (less than 5 percent by weight of active material of total mixture weight (active meaning the sulfonated oil) will have an effective viscosity which frequently is not sufficient to meet the mobility conditions for effective oil displacement. Without a viscosifying agent, the mobility of the sulfonate slug in the flooding process will frequently be greater than the total mobility of the oil-water bank, a condition which is known to adversely affect the oil recovery. It is therefore desirable to add a viscosifying agent to the mixture such as the water-soluble polymers described above to produce the desired mobility control conditions to cause the production of oil in an efficient manner when an aqueous petroleum sulfonate mixture is used. However, the addition of polymer to the petroleum sulfonate mixture decreases the maximum tolerable inorganic salt concentration which is consistent with a phase-stable mixture. Stability herein means that the mixture will not separate as discussed above and by experiment, it has been shown that if a mixture that is left at rest and will not phase separate in 5 days, then the mixture is considered stable. Phase separation in less than 5 days is considered to be an unstable mixture. If separation did not occur within 5 days, the mixtures appeared stable indefinitely.

As used hereinafter, Ark-Burbank water and SCBIW were waters having the following analyses:

| Component | Water Composition (PPM by weight) | |
|---|---|---|
| | Ark-Burbank* | SCBIW** |
| Na+ | 299 | 1056 |
| Ca++ | 107 | 130 |
| Mg++ | 30 | 87 |
| Cl− | 747 | 610 |
| SO$_4$= | 0 | 798 |
| HCO$_3$− | 0 | 1569 |
| ppm Total Dissolved Solids | 1183 | 4250 |

*Simulated field brine from the North Burbank Unit, Osage County, Okla.
**Simulated CutBank Injection Water, South West CutBank Unit, Montana.

To illustrate stability at various polymer and salt concentrations, Table I is provided.

TABLE I

Phase Stability of Aqueous Petroleum Sulfonate Dispersions Containing Kelzan MF and Na$_2$SO$_4$

| PPM Kelzan MF | Wt. % Na$_2$SO$_4$ | | | | | |
|---|---|---|---|---|---|---|
| | 0.0 | 1.0 | 2.0 | 3.0 | 4.0 | 5.0 |
| 0 | S* | S | S | S | S | S |
| 250 | S | US** | US | US | US | US |
| 500 | S | US | US | US | US | US |
| 1000 | S | US | US | US | US | US |

*S - Phase Stable
**US - Phase Unstable
All solutions contained 3.0% of total mixture weight active petroleum sulfonate (Stepan Agent 587-50-2) at 78° F. The water used was synthetic Ark-Burbank water.

Table I shows the effect of the addition of Kelzan MF (a polysaccharide polymer) when sodium sulfate is added to an aqueous petroleum sulfonate mixture. After preparation of a mixture containing water, petroleum sulfonate, Kelzan MF and sodium sulfate, each mixture was allowed to equilibrate undisturbed in a controlled temperature environment. Evidence of phase separation (usually surfactant precipitation or flocculation) was usually apparent after one to five days and, hence, unstable. The first line shows that the dispersion with no Kelzan MF present is stable when up to 5 percent sodium sulfate is added. The table further shows in column 2, that the mixture is stable when Kelzan MF is increased up to 1000 ppm with no salt present, but when salt is added, along with the Kelzan MF in increasing amounts from 1 to 5 percent for the salt and 250 ppm to 1000 ppm Kelzan MF, unstable mixtures result. This table shows the use of 3 percent active petroleum sulfonate at 78° F. with the salt content being varied. The importance of this table is in the fact that it shows that petroleum sulfonate mixtures containing a sufficient amount of mobility controlling agent (polymer) would be unstable, and therefore not useable when from 1 to 5 weight percent of sodium sulfate is added to reduce the interfacial tension to an effective value. Also from this example, in FIG. 2 and Table I, it appears that stable aqueous mixtures of Stepan Agent 587-50-2 (as shown in Table II, line 1) which contains sufficient amounts of mobility control agent (1000 ppm Kelzan MF) and inorganic salts to produce the desired mobility control, the interfacial tension for effective oil displacement cannot be realized. This problem is overcome by the removal of at least a portion of th diluent oil from the petroleum sulfonate and adding thereto a preferred oil as described above.

Table II, produced below, illustrates, in part, the present invention wherein the petroleum sulfonate (Stepan Agent 587-50-2) had removed therefrom the diluent oil wherein the diluent oil was reduced to 15 percent or less by weight of the mixture of same with the active petroleum sulfonate. It was necessary to remove this oil because it did not possess the characteristics preferred for preparing phase stable mixtures.

TABLE II

| PPM Kelzan MF | Wt. %[1] Sulfonate | Oil: Active Sulfonate Ratio | Wt. % Na$_2$SO$_4$ | | | | |
|---|---|---|---|---|---|---|---|
| | | | 0.0 | 1.0 | 2.0 | 3.0 | 4.0 | 5.0 |
| 1000 | 3 | 1.1[2] | S | US | US | US | US | US |
| 1000 | 3 | 1.1[3] | S | S | S | S | S | US |

All dispersions contained 0.2% Na$_5$P$_3$O$_{10}$ + 0.1% Na$_2$CO$_3$.
[1]Stepan Agent 587-50-2 (based on active sulfonate).
[2]Diluent oil in Stepan Agent 587-50-2.
[3]Necton 37.
S - Phase Stable
US - Phase Unstable (at 78° F.)
The water used was synthetic Ark-Burbank water.

The oil in the petroleum sulfonate of this example was extracted on a silica gel column via ASTM 2548. A light naphthenic oil (Necton 37) was then blended with extracted petroleum sulfonate (deoiled) and aqueous dispersions of this petroleum sulfonate and Kelzan MF were prepared with various concentrations of Na$_2$SO$_4$. Necton 37 oil is a light naphthenic oil having an average molecular weight equal to approximately 285 with a distillation curve for Necton 37 oil being illustrated as line D in FIG. 3. Gas liquid chromatography measurements indicated that the mean carbon number of the Necton 37 oil was equal to 22 with a range from 14 to 33. Necton 37 is manufactured and sold by Exxon Corp., 1251 Avenue of the Americas, New York, N.Y. 10020.

The phase stability of the above-described mixtures was compared with the phase stability of similar mixtures containing the untreated Stepan Agent with the results of the tests being shown in Table II. Table II, line 2, shows that mixtures of Stepan Agent 587-50-2 containing Necton 37 formed a stable mixture when up to 4 percent Na$_2$SO$_4$ was added to the mixture which also contained 1000 ppm Kelzan MF while the same mixture containing Stepan Agent (line 1) which did not have the diluent oil removed and additive oil adjustment produced an unstable mixture when 1 to 5 percent Na$_2$SO$_4$ was added. These results illustrate that although the oil to petroleum sulfonate ratio in the two trials was of approximately the same amount, the mixture prepared using the deoiled petroleum sulfonate to which the Necton 37 oil was added had substantially increased tolerance to inorganic salt concentration relative to that of the mixture containing the petroleum sulfonate and residual oil.

Since it is not commercially practical to extract residual oil from a petroleum sulfonate using silica gel, another method which is more compatible with commercial operations was used for this extraction step. An alcohol-water extraction method was found to be suitable for this purpose. This method included the steps of preparing a 50-25-25 weight ratio mixture of petroleum sulfonate, isopropanol (IPA) and water, respectively, and allowing the mixture to phase separate (a three-phase system results) at 120° F. The middle phase of this mixture was separated from the remainder of the mixture and dried in a vacuum oven at 185° F. to a constant weight. When dried, the middle phase contained 85 weight percent active sulfonate plus 15 weight percent diluent oil. The thus treated petroleum sulfonate was used in a study to compare the phase stability of untreated petroleum sulfonate, in this case Stepan Agent 587-50-2, and the deoiled petroleum sulfonate. It is evident from the data in Table III produced below that a mixture of extracted petroleum sulfonate alone (without addition of a preferred oil) does not result in substantially increased inorganic salt tolerance, i.e., addition of oil to the sulfonate following the extraction is necessary to achieve enhanced tolerance of the mixture to the inorganic salts.

TABLE III

Phase Stability of Aqueous Petroleum Sulfonate Dispersions

| PPM Kelzan MF | Wt. % Sulfonate | Oil:Active Sulfonate Ratio | Wt. % Na$_2$SO$_4$ | | | | | | |
|---|---|---|---|---|---|---|---|---|---|
| | | | 0.0 | 1.0 | 2.0 | 3.0 | 4.0 | 5.0 | 6.0 |
| 1000 | 3[a] | 1.1[c] | S | US | US | US | US | US | US |
| 1000 | 3[b] | 0.2[d] | US | US | US | US | US | US | US |
| 1000 | 3[b] | 1.1[e] | S | S | S | S | S | S | US |

[a]Unextracted Stepan Agent 587-50-2 based on active sulfonate.
[b]Stepan Agent 587-50-2 extracted with IPA-water based on active sulfonate.
[c]Diluent oil contained in Stepan Agent 587-50-2.
[d]Diluent oil not removed by IPA-water extraction.
[e]Necton 37 oil plus diluent oil not removed by IPA-water extraction
S - Phase Stable
US - Phase Unstable (at 78° F.)
The water used was synthetic Ark-Burbank water.

Table III shows in column 3 the oil:petroleum sulfonate ratio with the ratio of oil:sulfonate being 1.1:1 in lines 1 and 3 and 0.2:1 in line 2. The data shows that when the oil:sulfonate ratio is 1.1, and the added oil is a preferred oil (line 3), the mixture containing 1000 ppm Kelzan MF can tolerate up to 5 percent Na$_2$SO$_4$.

Table IV is presented here to show the significance of the ratio of oil to petroleum sulfonate.

TABLE IV

Phase Stability of Dispersions of Witco TRS 10-410 Plus Kelzan MF as a Function of Oil:Petroleum Sulfonate Weight Ratio

| | 78° F. | | | 120° F. | | |
|---|---|---|---|---|---|---|
| | *Oil:Active Petroleum Sulfonate Weight Ratio | | | *Oil:Active Petroleum Sulfonate Weight Ratio | | |
| Wt. % Na$_2$SO$_4$ | .53 | .69 | 1.00 | .53 | .69 | 1.00 |
| 0.00 | S | S | S | S | S | S |
| 0.25 | S | S | S | S | S | S |

TABLE IV-continued

Phase Stability of Dispersions of Witco TRS 10-410 Plus Kelzan MF as a Function of Oil:Petroleum Sulfonate Weight Ratio

| Wt. % Na₂SO₄ | 78° F. *Oil:Active Petroleum Sulfonate Weight Ratio | | | 120° F. *Oil:Active Petroleum Sulfonate Weight Ratio | | |
|---|---|---|---|---|---|---|
| | .53 | .69 | 1.00 | .53 | .69 | 1.00 |
| 0.50 | S | S | S | S | S | S |
| 0.75 | US | S | S | S | S | S |
| 1.00 | US | S | S | S | S | S |
| 1.25 | US | US | S | US | S | S |
| 1.50 | US | US | S | US | S | S |
| 1.75 | US | US | S | US | US | S |
| 2.00 | US | US | US | US | US | S |
| 2.25 | US | US | US | US | US | S |
| 2.50 | US | US | US | US | US | S |
| 2.75 | US | US | US | US | US | S |
| 3.00 | US | US | US | US | US | US |

S - Phase Stable
US - Phase Unstable
*Oil C (FIG. 1)
All Dispersions Contained:
3% Witco TRS 10-410 (based on active sulfonate)
0.2% Na₅P₃O₁₀
0.1% Na₂CO₃
1000 ppm Kelzan MF
The water used was distilled water.

This table was based on the use of a commercial petroleum sulfonate (Witco TRS 10-410, described above) which contained a diluent oil with sufficiently suitable characteristics such that it did not need to be deoiled prior to making the oil-to-active sulfonate ratio adjustment to obtain the high salt tolerance. The data in Table IV demonstrates that the tolerance to inorganic salts of aqueous mixtures of Witco TRS 10-410 and Kelzan MF can be increased by increasing the oil-to-sulfonate ratio. Above an oil-to-sulfonate ratio of about 2.0:1, oil was of a sufficiently high level so as to not be further soluble in this particular system and any increase in oil above this value would have little, if any, effect on the mixture as same would not be dissolved therein. Note also from Table IV that a higher temperature also results in a higher tolerance to inorganic salt concentration.

Table V is produced herebelow and when considered in combination with FIG. 3, indicates that there exists an optimum type oil for stabilizing aqueous mixtures of a particular petroleum sulfonate.

TABLE V

Phase Stability of Dispersions of TRS 10-410 and Kelzan MF as a Function of Blended Oil Type

*Oil:Active Petroleum Sulfonate = 1 by weight

| Wt. % Na₂SO₄ | 78° F. | | | | | | 120° F. | | | | | |
|---|---|---|---|---|---|---|---|---|---|---|---|---|
| | Oil A⁽¹⁾ | Oil B⁽²⁾ | Oil F⁽³⁾ | Oil C⁽⁴⁾ | Oil D⁽⁵⁾ | Oil E⁽⁶⁾ | Oil A⁽¹⁾ | Oil B⁽²⁾ | Oil F⁽³⁾ | Oil C⁽⁴⁾ | Oil D⁽⁵⁾ | Oil E⁽⁶⁾ |
| 0.00 | S | S | S | S | S | S | S | S | S | S | S | S |
| 0.25 | S | S | S | S | S | S | S | S | S | S | S | S |
| 0.50 | S | S | S | S | S | S | S | S | S | S | S | S |
| 0.75 | S | S | S | S | S | S | S | S | S | S | S | S |
| 1.00 | S | S | S | S | S | US | S | S | S | S | S | S |
| 1.25 | S | S | S | S | S | US | S | S | S | S | S | S |
| 1.50 | US | S | S | S | S | US | S | S | S | S | S | S |
| 1.75 | US | S | S | S | US | US | S | S | S | S | S | US |
| 2.00 | US | S | S | US | US | US | S | S | S | S | S | US |
| 2.25 | US | US | US | US | US | US | US | S | S | S | S | US |
| 2.50 | US | US | US | US | US | US | US | S | S | S | S | US |
| 2.75 | US | US | US | US | US | US | US | S | S | S | US | US |
| 3.00 | US | US | US | US | US | US | US | S | S | US | US | US |
| 3.25 | US | US | US | US | US | US | US | US | US | US | US | US |

*Witco TRS 10-410 Diluent Oil plus selected oil.
⁽¹⁾Oil A - Unreacted Oil from Stephan Agent 587-50-2 (experimental).
⁽²⁾Oil B - Kansas City 10 - Lube Stock (commercial).
⁽³⁾Oil F - Witco coproduct oil #40728.
⁽⁴⁾Oil C - Oil contained in Witco TRS 10-140 (experimental).
⁽⁵⁾Oil D - Necton 37 (commercial).
⁽⁶⁾Oil E - SOR-7 hydrobottoms (experimental).
S - Phase stable
US - Phase separation
All solutions contained:
3% active Witco TRS 10-410
0.2% Na₃P₃O₁₀
0.1% Na₂CO₃
1000 ppm Kelzan MF
The water used was distilled water.

The phase stability of aqueous mixtures of Witco TRS 10-410 (3 percent active sulfonate by weight) and Kelzan MF (1000 ppm) prepared from petroleum sulfonate blends using oils of various molecular weights is shown in the above-produced Table V. In combination of the data in Table V and FIG. 3, it is seen that an optimum oil would have a distillation temperature in the range of 600° F. to 1100° F., and preferably from 700° F. to 900° F. and have a molecular weight of approximately 250 to 400, these giving the higher tolerance to salt in the mixture. Note that the petroleum sulfonate containing Oil C which is Witco TRS 10-410 with diluent oil will tolerate relatively high inorganic salt content and therefore extraction of this oil is not required as it is the diluent oil contained in this particular petroleum sulfonate.

Table VI is presented below to compare the phase stability of two different polymers which are Kelzan MF and Betz Hi-Vis. Betz Hi-Vis is a polyacrylamide and Kelzan MF is a polysaccharide.

TABLE VI

Phase Stability of Dispersions of Witco TRS 10-410 + Polymer as a Function of Oil Type

| Wt. % Na$_2$SO$_4$ | 78° F. Oil:Active Petroleum Sulfonate Weight Ratio = 1 | | | 120° F. Oil:Active Petroleum Sulfonate Weight Ratio = 1 | | |
|---|---|---|---|---|---|---|
| | Oil B* | Oil D* | Oil E* | Oil B* | Oil D* | Oil E* |
| KELZAN MF | | | | | | |
| 0.00 | S | S | US | S | S | S |
| 0.25 | S | S | US | S | S | US |
| 0.50 | S | S | US | S | S | US |
| 0.75 | S | S | US | S | S | US |
| 1.00 | S | US | US | S | S | US |
| 1.25 | S | US | US | S | S | US |
| 1.50 | S | US | US | S | S | US |
| 1.75 | US | US | US | S | US | US |
| 2.00 | US | US | US | S | US | US |
| 2.25 | US | US | US | US | US | US |
| BETZ HI VIS | | | | | | |
| 0.00 | S | S | US | S | S | S |
| 0.25 | S | S | US | S | S | S |
| 0.50 | S | S | US | S | S | US |
| 0.75 | S | US | US | S | S | US |
| 1.00 | S | US | US | S | S | US |
| 1.25 | S | US | US | S | S | US |
| 1.50 | US | US | US | S | S | US |
| 1.75 | US | US | US | S | US | US |
| 2.00 | US | US | US | S | US | US |
| 2.25 | US | US | US | US | US | US |

S - Phase Stable
US - Phase Unstable
*See Table V and FIG. 3
Solutions contained:
3% Witco TRS 10-410 (Deoiled) based on active sulfonate
0.2% Na$_5$P$_3$O$_{10}$
0.1% Na$_2$CO$_3$
1000 PPM Polymer
The water used was distilled water.

Witco TRS 10-410 was deoiled to have essentially 0 percent diluent oil via ASTM 2548 and reoiled with a selected oil.

This table shows the use of three different types of oil at two different temperatures with the oil designation being the same as that in Table V and the use of the two different polymers shows very little difference in stability for the particular test conditions used.

Table VII is presented herebelow to illustrate phase stability as a function of the percent of active petroleum sulfonate present in the mixture.

TABLE VII

Phase Stability of Dispersion of Witco TRS 10-410 as a Function of Sulfonate Concentration

*Oil:Active Petroleum Sulfonate = 1 by weight

| Wt. % Na$_2$SO$_4$ | 78° F. Weight Percent Active TRS 10-410 | | | 120° F. Weight Percent Active TRS 10-410 | | |
|---|---|---|---|---|---|---|
| | 1.0 | 3.0 | 5.0 | 1.0 | 3.0 | 5.0 |
| 0.00 | S | S | S | S | S | S |
| 0.25 | S | S | S | S | S | S |
| 0.50 | S | S | S | S | S | S |
| 0.75 | S | S | S | S | S | S |
| 1.00 | S | S | S | S | S | S |
| 1.25 | S | S | S | S | S | S |
| 1.50 | S | S | S | S | S | S |
| 1.75 | US | S | US | S | S | S |
| 2.00 | US | US | US | S | S | S |
| 2.25 | US | US | US | S | S | US |
| 2.50 | US | US | US | US | S | US |
| 2.75 | US | US | US | US | S | US |
| 3.00 | US | US | US | US | US | US |

S - Phase Stable
US - Phase Separation
*Oil C
All Dispersions Contained:
0.2% Na$_5$P$_3$O$_{10}$
0.1% Na$_2$CO$_3$
1000 ppm Kelzan MF
The water used was a distilled water.

This table shows the effect of variation of sulfonate concentration, in steps of 1, 3 and 5 percent by weight active sulfonate at two temperatures, 78° F. and 120° F., on the phase stability as the concentration of inorganic salt increases. 1000 PPM of Kelzan MF was used in the mixtures and the ratio of oil:petroleum sulfonate was 1. It is seen that some difference in stability was realized in the increase of the petroleum sulfonate concentration in the mixture.

Tables IV, V, VI and VII show that phase stability is dependent on temperature. The particular mixture and method of producing same described above applies equally well to an aqueous petroleum sulfonate mixture to which a cosurfactant or cosurfactants have been added. Useable cosurfactants include alcohols such as isopropanol, n- and isobutanols. As an example, the phase stability of an aqueous mixture of Witco TRS 10-410 (3 active weight percent) plus 3 percent isobutanol plus 2000 PPM Betz Hi-Vis polyacrylamide polymer is shown in Table VIII produced herebelow:

TABLE VIII

| Wt. % Betz Hi Vis | R[2] | Wt. % NaNO$_2$ (in SCBIW[1]) | | | | | | | |
|---|---|---|---|---|---|---|---|---|---|
| | | 0.0 | 0.25 | 0.50 | 0.75 | 1.00 | 1.25 | 1.50 | 1.75 |
| 0.2 | 0 | US | US | US | US | US | US | US | US |
| 0.2 | 1.0 | S | S | S | US | US | US | US | US |
| 0.2 | 1.1 | US | US | S | S | S | US | US | US |
| 0.2 | 1.5 | US | US | US | US | S | S | S | US |

S - Phase Stable
US - Phase Unstable
[1]SCBIW - Simulated Cut Bank Injection Water.
[2]R - ratio of the oil:active petroleum sulfonate. Total oil equals diluent oil plus Oil P.
All of the above dispersions contained:
3% active Witco TRS 10-410
3% isobutanol
in addition to indicated ingredients.

The data in this table shows that an increase in the oil:petroleum sulfonate ratio increases the tolerance of the mixture to inorganic salt concentrations, as was the case in the systems containing no cosurfactant.

The following examples demonstrate the use of the present invention as a petroleum sulfonate slug mixture useable as an oil displacement medium.

EXAMPLE I

Petroleum sulfonate mixture flood oil displacement tests were conducted in Berea sandstone cores (3 in. diameter by 3 ft. long) containing oil field crude oil (from Southwest Cut Bank Unit, Cut Bank, Montana) and simulated Cut Bank resident brine. In each test (see table) the cores were (1) saturated with brine, (2) oil flooded to connate water with the crude oil, (3) water-flooded with the brine to residual oil saturation. The cores were then flooded with the petroleum sulfonate mixture as listed in Table IX produced below:

solution which had a viscosity equal to or greater than the petroleum sulfonate slug was injected after a surfactant slug as a mobility buffer.

In each test, a preslug (0.4 pore volumes) containing the same inorganic salts as the surfactant slug was in-

TABLE IX

Slug Sequences for Oil Displacement Test

Composition (wt. percent)[a]

| Slug | Slug Size (PV) | Active Petroleum Sulfonate[b] | Betz Hi-Vis[c] | $Na_2SO_4$ | $Na_2CO_3$ | $Na_5P_3O_{10}$ | Betz Hi-Vis Test 1 | Test 2 | Test 3 |
|---|---|---|---|---|---|---|---|---|---|
| Preslug | 0.25 | — | — | 4.0 | 0.10 | 0.4 | 0.0 | 0.0 | 0.0 |
| Surf Slug. | 0.10 | 3.0 | 0.20 | 4.0 | 0.10 | 0.4 | 0.005 | 0.20 | 0.30 |
| Mobility Buffer | Continuous | — | 0.20 | 4.0 | 0.10 | 0.4 | 0.30 | 0.30 | 0.30 |

[a]Solution for Tests prepared in simulated Cut Bank injection water.
[b]Active ingredient Stepan Agent 587-50-2 (IPA-water extracted, Necton 37 oil blended with the petroleum sulfonate at 1:1 total oil to active sulfonate ratio).
[c]$NaNO_2$ (0.5 wt. percent) was added to solutions to reduce oxygen degradation of the polymer.

Oil Displacement Test in 3-foot Long Berea Cores

| | Test 1 | Test 2 | Test 3 |
|---|---|---|---|
| Core Length (cm) | 87.7 | 88.6 | 88.5 |
| Core diameter (cm) | 7.6 | 7.6 | 7.6 |
| Crude Oil | Cutbank | Cutbank | Cutbank |
| $S_{oi}$ (%) | 65.2 | 70.1 | 69.4 |
| $S_{or}$ (%) | 42.2 | 43.5 | 42.1 |
| PV (cc) | 843 | 738 | 754 |
| Specific Brine Perm. (md) | 465 | 184 | 442 |
| Brine Perm. at $S_{or}$ (md) | 25.7 | 16.7 | 21.0 |
| Connate Water Sat/n (%) | 57.8 | 56.6 | 57.9 |
| Tertiary Oil Recovery (%) | 45.4 | 56.9 | 62.8 |
| Total Oil Recovery (%) | 64.5 | 73.3 | 77.46 |
| Final Oil Sat'n (%) | 23.1 | 15.7 | 15.8 |
| Frontal Velocity (ft/day) | 0.56 | 0.68 | 0.66 |
| Max. Press. Gradient (psi/ft) | 3.7 | 5.7 | 4.5 |

Definition of terms used in TABLE IX:
(cm) - Centimeter
(md) - Millidarcy
$S_{oi}$ (%) - Initial oil saturation. The $S_{oi}$ % + connate water saturation % = 100%
$S_{or}$ (%) - Residual oil saturation after water flood, or the amount of oil in place before tertiary flood (surfactant flood)
PV (cc) - Pore volume in cc = pore volume in the core
Specific Brine Perm (md) - The permeability of the core to brine in millidarcy
Brine Perm at $S_{or}$ (md) - Brine permeability at residual oil saturation in millidarcy
Connate Water Saturation (%) - The percent of the core containing water initially (see $S_{oi}$ above)
Tertiary Oil Recovery (%) - The percent of the oil recovered by surfactant flood based on the amount present after water flooding
Total Oil Recovery (%) - Oil recovered by primary, secondary or water flood and tertiary or surfactant flood
Final Oil Saturation (%) - Oil remaining in the core after tertiary oil recovery
Frontal Velocity (ft/day) - Velocity with which the surfactant traveled through the core
Maximum Pressure Gradient (psi/ft) - Pounds pressure across core in psi divided by the length of the core in feet It is accepted in the laboratory that if a dispersion remains stable 5 days, it will remain stable for several months. Further, if the dispersion breaks down under 5 days, it is considered an unstable dispersion.

The results shown in Table IX demonstrate the effect of the addition of polymer as a mobility control agent to a petroleum sulfonate mixture containing Stepan Agent 587-50-2. For the reasons discussed above, it was necessary to extract the diluent oil from the petroleum sulfonate since the oil contained in this petroleum sulfonate was not suitable for obtaining the desired phase stability at higher salt concentrations. After deoiling via the IPA-water technique, the petroleum sulfonate contained approximately 15 percent unextracted diluent oil and this mixture was blended with Necton 37 oil to a total oil-to-active sulfonate weight ratio of 1 based on the results of Table III and FIG. 1. Aqueous petroleum sulfonate mixtures were then prepared from this petroleum sulfonate and oil mixture and varying polymer concentrations. The table shows the results of three oil displacement tests conducted using 10 percent pore volume slugs of these dispersions which contained 3 percent active Stepan Agent 587-50-2, 5 percent total inorganic salts, concentrations of a polyacrylamide polymer of 500, 2000 and 3000 ppm. In each test, a polymer jected to adjust the salinity of the resident brine to the desired value. In comparing the tests it is significant to note that as the polymer concentration was increased from 500 to 2000 to 3000 ppm, recovery of waterflood residual oil increased from 45 to 57 to 63 percent. This is attributed to the enhanced mobility control of the surfactant slug resulting from the increased viscosity. The surfactant slug viscosity (Brookfield at 6 RPM) was 5, 24 and 61 centipoise, respectively. It is to be emphasized that without the oil to sulfonate ratio adjustment, none of the three dispersions would have been phase stable and hence not useable in surfactant flood processes. These results demonstrate the utility of adding polymer to surfactant flood composition and point to the significance of the invention disclosed herein.

EXAMPLE II

The following tests further demonstrate the utility of the present invention, in particular, for petroleum sulfonate (surfactant) flood mixtures containing a cosurfactant. In a manner similar to that outlined in Example I, 3 ft. long by 3 in. diameter Berea sandstone cores were flooded to residual oil with a Cut Bank crude oil. The results of these tests using the slug sequences shown in Table X are given in Table XI produce here below:

TABLE X

Slug Sequence for Oil Displacement Tests (78° F.)

|  | Test 4 | Test 5 | Test 6 | Test 7 |
|---|---|---|---|---|
| Water used for Solution Preparations: | Distilled Water | Distilled Water | SCBIW* | SCBIW* |
| Preflush | | | | |
| Size, PV | 0.4 | 0.4 | 0.4 | 0.4 |
| Composition of Salts Added, wt. % | | | | |
| NaCl | 0.0 | 0.0 | 0.60 | 0.75 |
| $NaNO_2$ | 1.125 | 1.125 | 0.00 | 0.00 |
| $Na_5P_3O_{10}$ | 0.20 | 0.20 | 0.40 | 0.40 |
| $Na_2CO_3$ | 0.10 | 0.10 | 0.10 | 0.10 |
| Surfactant Slug | | | | |
| Size, PV | 0.10 | 0.10 | 0.10 | 0.10 |
| Composition, wt. % (plus salts in preflush) | | | | |
| Active Witco TRS 10-410 | 3.00 | 3.00 | 3.0 | 3.0 |
| Isobutanol | 3.00 | 3.00 | 3.0 | 3.0 |
| Hi-Vis polyacrylamide | 0.00 | 0.10 | 0.00 | 0.10 |
| Added oil | 0.0 | 1.5 | 0.0 | 1.5 |
| Type | — | Type F | — | Type F |
| Mobility Buffer | | | | |
| Amount, PV** | 0.5 | 0.5 | 0.5 | 0.5 |
| Peak viscosity, cp | 36 | 36 | 36 | 36 |
| Peak concentration of Betz Hi-Vis polyacrylamide, wt. % | 0.20 | 0.20 | 0.20 | 0.20 |
| Added Salts | 1.125% $NaNO_2$ | 1.25% $NaNO_2$ | None | None |

*Simulated Cut Bank injection water.
**A volume of the polymer solution equal to one-half the core PV (pore volume) was continuously diluted with brine containing the same salts as the polymer solution.

TABLE XI

Oil Displacement Test in 3-Foot Long Berea Cores

|  | Test 4 | Test 5 | Test 6 | Test 7 |
|---|---|---|---|---|
| Core length (cm) | 87.9 | 86.3 | 87.1 | 86.8 |
| Core diameter (cm) | 7.6 | 7.6 | 7.6 | 7.6 |
| $S_{oi}\%$ | 70.2 | 69.6 | 68.8 | 68.5 |
| $S_{or}\%$ | 39.7 | 39.4 | 41.1 | 40.8 |
| PV (cc) | 819 | 759 | 854 | 833 |
| Specific Brine Perm. (md) | 677 | 627 | 475 | 690 |
| Brine Perm. at $S_{or}$ (md) | 39 | 25 | 30 | 38 |
| Connate Water Sat/n (%) | 29.8 | 30.4 | 31.2 | 31.5 |
| Tertiary Oil Recovery (%) | 82.0 | 95.7 | 75.7 | 88.1 |
| Total Oil Recovery (%) | 90.1 | 97.5 | 85.5 | 92.9 |
| Final Oil Sat'n (%) | 6.9 | 2.5 | 10.0 | 4.8 |
| Frontal Velocity (ft/day) | 0.6 | 0.6 | 0.6 | 0.6 |
| Max. Press. Gradient (psi/ft) | 0.8 | 0.8 | 0.9 | 0.9 |

In tests 4 and 5 the resident brine contained 1.125 weight percent $NaNO_2$ in distilled water. In tests 6 and 7 the resident brine was a simulated Cut Bank brine. The slug sequences for tests 4 and 5 were similar except that in test 5 a polyacrylamide polymer (Betz Hi-Vis) was added to the slug at a concentration of 1000 ppm by weight. Likewise, the slug sequences for tests 6 and 7 were similar except that the polyacrylamide polymer (Betz Hi-Vis) was added to the surfactant slug at a concentration of 1000 ppm. In both cases where polymer was added to the surfactant slug, the oil to active sulfonate ratio had to be adjusted as taught in this invention to obtain phase stable compositions. Again, as in the previous examples, a preslug was used to adjust the salinity of the resident brine and the surfactant slug was followed by a viscous mobility buffer. As the data in Table XI show, the surfactant systems containing the polymer recovered significantly greater amounts of the waterflood residual oil (98 and 86 versus 82 and 76 percent, respectively). These results again are attributed to the enhanced mobility conditions achieved with the more viscous polymer-containing surfactant system.

The effect of adding a viscosifying agent to surfactant flood compositions through the teachings of the invention disclosed herein has been demonstrated in the above examples for relatively uniform porous media. The effect would be expected to be even more pronounced in porous media with greater permeability variation, a feature which would be expected for most oil reservoir porous media.

It is to be understood that while I have described certain forms of my invention, it is to be understood that same is not to be limited to the specific forms described herein.

I claim:

1. A method of displacing oil in an oil bearing subterranean formation, said method including the steps of:
    (a) removing a diluent oil from feed comprising a petroleum sulfonate containing diluent oil and active petroleum sulfonate to form a substantially deoiled petroleum sulfonate with the remaining diluent oil being present in an amount of less than about 15 percent by weight of the total weight of diluent oil and active petroleum sulfonate;
    (b) forming a mixture containing the deoiled petroleum sulfonate, water soluble polymer effective for increasing the viscosity of the mixture, water, inorganic salt capable of forming an admixture with water and capable of reducing the interfacial tension between the mixture and the oil contained in said formation, and a first oil, said first oil having a distillation temperature of between about 600° F. and about 1100° F. and being effective to increase the tolerance of the mixture of the inorganic salt and provide a stable mixture, said mixture having the components mixed in relative proportions to achieve an interfacial tension of less than about 0.01 dynes per centimeter with oil contained in the formation, said first oil plus remaining diluent oil, if any, and the active petroleum sulfonate being in a weight ratio of at least about 0.5:1 of first oil and diluent oil, if any, to active petroleum sulfonate, said water soluble polymer being present in an amount sufficient to increase the viscosity of the mixture above the viscosity which the mixture would have without the water soluble polymer, said diluent oil being characterized by causing instability upon mixing said feed, said water soluble polymer, water and said inorganic salt; and
(c) injecting said mixture into an oil-bearing subterranean formation.

2. The method as set forth in claim 1 wherein:
(a) said first oil having an average molecular weight of approximately 250 to 400.

3. The method as set forth in claim 1 wherein:
(a) said first oil being a naphthenic oil.

4. The method as set forth in claim 1 wherein:
(a) said mixture having active petroleum sulfonate in an amount of approximately 1 to 10 percent by weight, inorganic salt in an amount of up to approximately 10 percent by weight, said inorganic salt being a monovalent metallic salt, and polymer in an amount of approximately 0.005 to 1.0 percent by weight.

5. The method as set forth in claim 1 wherein:
(a) said polymer includes one of polyacrylamide, polysaccharide and carboxymethylcellulose.

6. The method as set forth in claim 1 wherein:
(a) said mixture having an interfacial tension with oil contained in the formation of in the range of 0.01 to 0.001 dynes per centimeter.

7. The method as set forth in claim 1 wherein:
(a) said mixture including a cosurfactant in an amount of up to approximately 10 percent by weight.

8. A method of preparing a viscous slug usable for displacing oil in an oil bearing subterranean formation, said steps including the steps of:
(a) extracting from feed comprising a petroleum sulfonate containing a diluent oil and active petroleum sulfonate, at least a portion of the diluent oil, leaving active petroleum sulfonate and diluent oil in an amount of less than about 15 percent by weight of the total weight of diluent oil and active petroleum sulfonate;
(b) adding a first oil having a distillation temperature of between about 600° F. and about 1100° F. to the active petroleum sulfonate whereby said first oil increases the tolerance of a mixture of the first oil, active petroleum sulfonate, water soluble polymer effective for increasing the viscosity of the mixture, water and monovalent metallic salt capable of forming an admixture with water and capable of reducing the interfacial tension between the mixture and oil contained in said formation to the inorganic salt than would be obtainable if the portion of the diluent oil had not been extracted, said first oil plus remaining diluent oil and active petroleum sulfonate being in a ratio of at least about 0.5:1 of the first oil plug remaining diluent oil to active petroleum sulfonate; and
(c) mixing said first oil and active petroleum sulfonate with water, water soluble polymer, and monovalent metallic salt, said first oil, active petroleum sulfonate, water, water soluble polymer and inorganic salt are in relative proportions and said first oil being of a type to achieve a stable mixture with an interfacial tension of less than about 0.01 dynes per centimeter with oil contained in a formation, said water soluble polymer being present in an amount sufficient to increase the viscosity of the mixture above the viscosity which the mixture would have without the water soluble polymer, said diluent oil being characterized by causing instability upon mixing said feed, said water soluble polymer, water and said inorganic salt.

9. The method as set forth in claim 8 wherein:
(a) said first oil having an average molecular weight of between approximately 250 to 400.

10. The method as set forth in claim 8 wherein:
(a) said first oil being a naphthenic oil.

11. The method as set forth in claim 8 wherein:
(a) said polymer includes one of polyacrylamide, polysaccharide and carboxymethylcellulose.

12. The method as set forth in claim 8 wherein said method includes:
(a) mixing a cosurfactant in an amount of up to approximately 10 percent by weight with said first oil, deoiled petroleum sulfonate, water, polymer and monovalent metallic salt.

13. A method of displacing residual oil in an oil-bearing subterranean formation with an aqueous mixture containing a first oil and petroleum sulfonate, said method including the steps of:
(a) adjusting the first oil-to-active petroleum sulfonate weight ratio to within a range of approximately 0.5:1 to approximately 2.0:1, said first oil having a distillation temperature of between about 600° F. and about 1100° F.;
(b) forming a mixture of water, first oil, active petroleum sulfonate, water soluble polymer effective for increasing the viscosity of the mixture, and monovalent metallic salt capable of forming an admixture with water and capable of reducing the interfacial tension between the mixture and residual oil contained in the formation, said first oil being capable of and said inorganic salt and petroleum sulfonate being in amounts effective for producing a stable mixture having an interfacial tension of less than about 0.01 dynes per centimeter with residual oil in the formation, said water soluble polymer being present in an amount sufficient to increase the viscosity of the mixture above the viscosity which the mixture would have without the water soluble polymer; and
(c) injecting said mixture into said oil-bearing subterranean formation.

14. A mixture usable in secondary oil recovery, said mixture including:
(a) active petroleum sulfonate in an effective amount of up to approximately 10 percent by weight of the total mixture weight;
(b) an oil having a distillation temperature of between about 600° F. and about 1100° F. and being in a weight ratio with active petroleum sulfonate in the range of about 0.5:1 to about 2.0:1, said oil being capable of producing a stable mixture having an interfacial tension with residual oil in an oil bearing porous medium of less than about 0.01 dyne per centimeter;
(c) water soluble polymer effective for increasing the viscosity of the mixture in an effective amount of up to approximately 1 percent by weight of the total mixture weight;
(d) monovalent metallic salt capable of forming an admixture with water and capable of reducing the interfacial tension between the mixture and the residual oil to less than about 0.01 dyne per centimeter in an effective amount of up to approximately 10 percent by weight of the total mixture weight; and (e) water in a quantity to make up the remainder of the mixture.

15. The mixture as set forth in claim 14 wherein:
(a) said polymer is one of polysaccharide, polyacrylamide and carboxymethylcellulose.

16. The mixture as set forth in claim 15 including:
(a) a cosurfactant in an amount of up to approximately 10 percent by weight of the total mixture weight.

17. A method of displacing oil in an oil bearing subterranean formation, said method including the steps of:
removing a diluent oil from feed comprising a petroleum sulfonate containing diluent oil and active petroleum sulfonate to form a substantially deoiled petroleum sulfonate with the remaining diluent oil being present in an amount of less than about 15 percent by weight of the total weight of the diluent oil and petroleum sulfonate;
forming a mixture containing the deoiled petroleum sulfonate, water, inorganic salt capable of forming an admixture with water and capable of reducing the interfacial tension between the mixture and the oil contained in said formation, and a first oil, said first oil having a distillation temperature in the range from about 600° F. to about 1100° F. and being effective to increase the tolerance of the mixture of the inorganic salt and provide a stable mixture, said mixture having the components mixed in relative proportions to achieve an interfacial tension of less than about 0.01 dynes per centimeter with oil contained in the formation, said first oil plus remaining diluent oil, if any, and the active petroleum sulfonate being in a weight ratio of at least about 0.5:1 of first oil and diluent oil, if any, to active petroleum sulfonate, said diluent oil being characterized as causing instability upon mixing said feed, said water and said inorganic salt and upon mixing of the resulting mixture with a mobility buffer containing water and water soluble polymer effective for increasing the viscosity of the mobility buffer; and
injecting said mixture into an oil bearing subterranean formation followed by said mobility buffer.

18. A method in accordance with claim 17 wherein said first oil is characterized further as having an average molecular weight in the range from about 250 to about 400.

19. A method in accordance with claim 17 wherein said first oil is characterized further as being a naphthenic oil.

20. A method in accordance with claim 17 wherein said mixture is characterized further as having active petroleum sulfonate in the range from about 1 to about 10 percent by weight, and inorganic salt in an amount of up to about 10 percent by weight, said inorganic salt being a monovalent metallic salt.

21. A method in accordance with claim 17 wherein said water soluble polymer includes one of polyacrylamide, polysaccharide and carboxymethylcellulose.

22. A method in accordance with claim 17 wherein said mixture is characterized further to include a cosurfactant in an amount of up to about 10 percent by weight.

23. A method in accordance with claim 17 wherein said mixture is characterized further as having an interfacial tension with oil contained in the formation of in the range of 0.01 to 0.001 dynes per centimeter.

24. A method in accordance with claim 17 wherein said mixture is characterized further to include a cosurfactant in an amount of up to about 10 percent by weight.

25. A method of preparing a viscous slug usable for displacing oil in an oil bearing subterranean formation, comprising:
preparing a mixture of active petroleum sulfonate, a first oil having a distillation temperature in the range from about 600° F. to about 1100° F. water, water soluble polymer, and monovalent metallic salt, said first oil increasing the tolerance of said mixture to said monovalent metallic salt to a greater degree than would be obtainable without said first oil and said first oil being of a type to achieve a stable mixture with an interfacial tension of less than 0.01 dynes per centimeter with oil contained in a formation with the weight ratio of said first oil to said active petroleum sulfonate being at least 0.5:1, and said water soluble polymer being present in an amount sufficient to increase the viscosity of the mixture above the viscosity which the mixture would have in the absence of the water soluble polymer.

26. A method in accordance with claim 25 wherein said first oil is characterized further as having an average molecular weight in the range from about 250 to about 400.

27. A method in accordance with claim 25 wherein said first oil is characterized further as being a naphthenic oil.

28. A method in accordance with claim 25 wherein said polymer includes one of polyacrylamide, polysaccharide and carboxymethylcellulose.

29. A method in accordance with claim 25 wherein said method includes:
mixing a cosurfactant in an amount of up to approximately 10 percent by weight with said mixture of said first oil, said activated petroleum sulfonate, said water, said water soluble polymer and said monovalent metallic salt.

30. A method of displacing residual oil in an oil bearing subterranean formation with an aqueous mixture containing a first oil and petroleum sulfonate, said method including the steps of:
adjusting the first oil-to-active petroleum sulfonate weight ratio to within a range of from about 0.5:1 to about 2.0:1, said first oil having a distillation temperature in the range from about 600° F. to about 1100° F.;
forming a first mixture of water, first oil, active petroleum sulfonate, and monovalent metallic salt capable of forming an admixture with water and capable of reducing the interfacial tension between the first mixture and residual oil contained in the formation, said first oil being capable of and said monovalent metallic salt and active petroleum sulfonate being in amounts effective for producing a stable mixture having an interfacial tension of less than about 0.01 dynes per centimeter with residual oil in the formation;
forming a second mixture of water and water soluble polymer, said water soluble polymer being present in an amount sufficient to increase the viscosity of said second mixture above the viscosity of said water in the absence of said water soluble polymer; and injecting into said oil bearing subterranean formation said first mixture immediately followed by said second mixture.

31. A method in accordance with claim 30 wherein said second mixture includes a monovalent metallic salt.

32. A method in accordance with claim 30 wherein water soluble polymer includes one of polyacrylamide, polysaccharaide and carboxymethylcellulose.

33. A mixture usable in post-primary oil recovery, said mixture including:

active petroleum sulfonate in an effective amount of up to approximately 10 percent by weight of the total mixture weight;

an oil having a distillation temperature in the range from about 600° F. to about 1100° F. and being in a weight ratio with active petroleum sulfonate in the range of from about 0.5:1 to about 2.0:1, said oil being capable of producing a stable mixture having an interfacial tension with residual oil in an oil bearing porous medium of less than about 0.01 dynes per centimeter;

monovalent metallic salt capable of forming an admixture with water and capable of reducing the interfacial tension between the mixture and the residual oil to less than about 0.1 dynes per centimeter in an effective amount of up to approximately 10 percent by weight of the total mixture weight; and water in a quantity to make up the remainder of the mixture.

34. A mixture in accordance with claim 33 characterized further to include:

a cosurfactant in an amount of up to approximately 10 percent by weight of the total mixture.

* * * * *